United States Patent Office 3,634,583
Patented Jan. 11, 1972

3,634,583
PHARMACEUTICAL COMPOSITION FOR THE TREATMENT OF OEDEMATOUS CONDITIONS AND HYPERTENSION
Peter Werner Feit, Gentofte, Denmark, assignor to Lovens Kemiske Fabrik Produktionsaktieselskab, Ballerup, Denmark
No Drawing. Filed July 24, 1969, Ser. No. 845,939
Int. Cl. A61k 27/00; A61j 3/10
U.S. Cl. 424—22                        18 Claims

ABSTRACT OF THE DISCLOSURE

The invention relates to diuretic and saluretic preparations in dosage unit form, containing the hitherto unknown 3 - butylamino - 4 - phenoxy - 5 - sulfamyl-benzoic acid or a salt thereof with a pharmaceutically acceptable base as the active component, if desired together with a hypotensor, the dose of the diuretic being between 0.1 and 10 mg. calculated as the free acid.

The invention further relates to a method of treating patients suffering from oedematous conditions and hypertension with the dosage units in question, administering from 0.1 to 25 mg. daily of the diuretic to the patient.

The present invention relates to a pharmaceutical composition for the treatment of oedematous conditions and hypertension, to dosage units of the composition, and to methods for the treatment of oedematous conditions and hypertension.

More particularly, the invention relates to a pharmaceutical composition containing as an active agent at least one member of the group selected from 3-butylamino-4-phenoxy-5-sulfamyl-benzoic acid and its salts with pharmaceutically acceptable inorganic and organic bases, together with auxiliary agents, and to a dosage unit of the composition for the treatment of oedematous conditions and hypertension.

The substance 3-butylamino-4-phenoxy-5-sulfamyl-benzoic acid is a new compound which may be prepared, for example, by 3-amino-4-phenoxy-5-sulfamyl-benzoic acid being butylated at the N-atom in the 3-position, as hereinafter described.

3 - butylamino - 4 - phenoxy - 5 - sulfamyl-benzoic acid possesses a favourable diuretic and saluretic activity. As far as the saluretic effect is concerned, the compound causes, in particular, an excretion of sodium and of chlorine in approximately equivalent proportions, while the excretion of the potassium ion remains substantially normal, or is only slightly increased.

It has been found that among a series of 4-substituted 3-R-amino-5-sulfamyl-benzoic acids, in which R represents alkyl, aralkyl, or a hetero radical, the 3-butylamino-4-phenoxy-5-sulfamyl-benzoic acid is superior in activity.

From a pharmaceutical point of view, it is a further advantage that 3-butylamino-4-phenoxy-5-sulfamyl-benzoic acid is chemically stable under acid conditions. Thus, for instance, no discoloration or loss in activity has been observed in pharmaceutical preparations containing the free acid, which when given orally is readily resorbed through the upper part of the gastro-intestinal tract and distributed in the body.

Specifically, it is advantageous that 3-butylamino-4-phenoxy-5-sulfamyl-benzoic acid has proved to be outstanding in having a diuretic effect which is comparable in type and activity to that of the well known diuretic Furosemide, belonging to the group of chlorosulfamyl-anthranilic acids.

The advantageous diuretic and saluretic effects of 3-butylamino - 4 - phenoxy - 5 - sulfamyl-benzoic acid, in the following Table I called PF 1593, have been demonstrated in animal experiments in which the test animals were female dogs. For intravenous injection, the compound was brought into solution with diluted sodium hydroxide, whereas oral application was in form of the free acid in capsules. Urine was taken by catheter at hourly intervals for a total of 6 hours after application. The following Table I contains the excretion of water, $Na^+$, $K^+$, and $Cl^-$ both for the first 3 hours and for the total period of 6 hours.

TABLE I.—DIURETIC ACTIVITY OF PF 1593 IN DOGS

| Dose, µg./kg. | Water, ml./kg. | | $Na^+$ | | $K^+$, mval./kg. | | $Cl^-$ | |
|---|---|---|---|---|---|---|---|---|
| | 3 hrs. | 6 hrs. | 3 hrs. | 6 hrs. | 3 hrs. | 6 hrs. | 3 hrs. | 6 hrs. |
| Intravenously: | | | | | | | | |
| 5 | 5.7 | 6.3 | 0.51 | 0.52 | 0.12 | 0.15 | 0.73 | 0.75 |
| 10 | 11 | 12 | 1.1 | 1.2 | 0.24 | 0.32 | 1.4 | 1.5 |
| 25 | 12 | 12 | 1.1 | 1.1 | 0.22 | 0.22 | 1.3 | 1.3 |
| 50 | 24 | 28 | 2.4 | 2.6 | 0.36 | 0.47 | 3.4 | 3.8 |
| 100 | 23 | 26 | 2.5 | 2.7 | 0.51 | 0.65 | 3.2 | 3.5 |
| Orally: | | | | | | | | |
| 5 | 4.5 | 5.7 | 0.72 | 0.94 | 0.25 | 0.3 | 0.88 | 1.1 |
| 10 | 11 | 15 | 1.2 | 1.4 | 0.32 | 0.39 | 1.5 | 1.8 |
| 25 | 19 | 20 | 2.1 | 2.2 | 0.31 | 0.33 | 2.9 | 3 |
| 50 | 29 | 32 | 3.2 | 3.4 | 0.56 | 0.7 | 4.5 | 4.9 |
| 100 | 25 | 33 | 2.9 | 3.7 | 0.44 | 0.65 | 3.8 | 4.9 |

It is apparent from the Table I that the diuretic effect is very intensive and short-lasting. It will further be seen that in most instances the effect of a given dose was more pronounced after oral than after intravenous application. This may be explained by the renal excretion of the drug being so rapid that not enough solute is available to be excreted within the short period of rather high serum concentrations after the intravenous injection. It shows further that the compound is excellently absorbed from the gastrointestinal tract.

In the animal experiment above the effect of PF 1593 was tested against the effect of the well-known diuretic Furosemide which until now has been considered one of the most active diuretics of this type. The comparison showed that 3-butylamino-4-phenoxy-5-sulfamyl-benzoic acid was 50–100 times as effective as Furosemide on a weight basis. The maximal effect obtainable with both compounds, however, seemed to be the same.

As far as the potassium excretion is concerned, Table I above illustrates a favourably low excretion of potassium when compared to the very high excretion of water and of sodium.

In order to determine the acute toxicity of 3-butyl-amino-4-phenoxy-5-sulfamyl-benzoic acid, animal experiments were performed. After intravenous injection an acute $LD_{50}$ of 330 mg./kg. (290–380) was determined. This corresponds well to the value of 308 mg./kg. given for Furosemide by Muschaweck and Hajdu (Arzneimittel-Forsch. 14, 44, 1964). Thus, the higher diuretic and saluretic activities of 3-butylamino-4-phenoxy-5-sulfamyl-benzoic acid taken into account, its toxicity must be considered extremely low.

When given orally in the above test, doses up to 1 g./kg. were given and survived by all mice.

Accordingly, it is the object of the invention to provide a pharmaceutical composition with diuretic and saluretic effect which is useful in the treatment of oedematous conditions, e.g. cardiac, hepatic, renal, lung, and brain oedema, of oedematous conditions during pregnancy, and of other pathological conditions disturbing the balance of the electrolyte concentration in the body, for example in the form of an abnormal retension of the sodium ion, in the treatment of congestive heart failure, and in the treatment of hypertension.

With this object in view the compositions of the invention contain as an active component at least one member of the group consisting of 3-butylamino-4-phenoxy-5-sulfamyl-benzoic acid and its pharmaceutically acceptable salts with inorganic and organic bases, together with solid or liquid pharmaceutical carriers and auxiliary agents.

In the said compositions, the percentage of the diuretically active substance can vary between 0.02 and 20%.

The compositions in question can be worked up to pharmaceutical forms of presentation, such as capsules, tablets, pills, dragées, and suppositories, or they can be filled into the usual containers for injectable medicines, such as vials or ampuls or, as far as liquid mixtures for oral use are concerned, they may be filled into bottles and similar containers.

Pharmaceutical organic or inorganic, solid or liquid carriers suitable for enteral and parenteral administration can be used to make up the compositions. For example, water, gelatine, lactose, starch, magnesium stearate, stearic acid, talc, vegetable and animal oils and fats, wax, benzyl alcohol, gum, polyalkylene glycol, cetyl-alcohol, petroleum jelly, cocoa butter, lanolin, and other known carriers for medicaments are all suitable as carriers here, while stabilizing agents, wetting or emulsifying agents, salts for varying the osmotic pressure, and buffers for securing an adequate pH-value of the composition, can be used as auxiliary agents.

Among suitable salts of 3-butylamino-4-phenoxy-5-sulfamyl-benzoic acid for use in the present compositions mention may be made of the alkali metal salts, the alkaline-earth metal salts, the ammonium salt, and salts with organic bases, such as the ethanolamine salt and the diethanolamine salt. Besides, the free acid itself may also be used in a composition according to the invention.

Thus, for preparations in the form of tablets or the like, or in injectable preparations, the sodium salt or the potassium salt may be used, being sufficiently water-soluble. For injectable preparations, however, salts with certain organic bases may advantageously be employed due to their high solubility in water.

The free acid or its salts may also be administered in capsules, or in effervescent tablets in order to obtain a quick resorption, or in sustained-release tablets in order to obtain a prolonged effect which, in particular, is desirable in the treatment of hypertension.

In addition to 3-butylamino-4-phenoxy-5-sulfamyl-benzoic acid or a salt thereof, the compositions of the invention may contain other suitable active components in the treatment of hypertension and odematous conditions, such as hypotensors, as hydralazine, methyldopa, reserpine, and other *Rauwolfia serpentina* alkaloids, veratrum alkaloids and/or tranquilizers, such as meprobamate, or potassium-sparing substances, such as triamterene.

Since hypopotassemia may sometimes occur in the course of prolonged treatment of hypertensive individuals, it has been found desirable in some cases to include a small amount of an organic potassium salt in the compositions of this invention, such as potassium acetate, potassium propionate, potassium lactate, potassium ascorbate, potassium mandelate, potassium hippurate, or potassium gluconate, or a nontoxic inorganic potassium salt, such as potassium chloride. Since hypochloremia as well as hypopotassemia sometimes occurs during treatment of hypertensive individuals, potassium chloride may be used to supply chloride ions as well as potassium ions.

The term "veratrum alkaloids," when used in this specification, is intended to cover the group of chemically related organic nitrogenous bases obtained from liliaceous plants belonging to the suborder Melanthaceae.

The veratrum alkaloids are useful in pure, crystalline form or in the form of mixtures obtained from the powdered root or rhizome. The preferred veratrum alkaloids for use in the composition of the present invention are *Veratrum viride*, and protoveratrine A and B.

The term "rauwolfia alkaloids" comprises the group of organic nitrogenous bases which may be obtained from *Rauwolfia serpentina* Benth. This component of the present invention may be used in the form of the powdered whole root or in the form of the pure crystalline alkaloids, reserpine, rescinnamine, and deserpidine, which are obtainable from the whole root. The above examples of additional active ingredients are not to be considered limitative for the compositions of the present invention.

Owing to the short-lasting effect of 3-butylamino-4-phenoxy-5-sulfamyl-benzoic acid, even when administered orally in the form of capsules, the compound is preferably administered in the form of sustained-release tablets. In such tablets 3 - butylamino - 4 - phenoxy-5-sulfamyl-benzoic acid, preferably in the form of a water-soluble salt, can be embedded in a tablet core consisting of a hydrophobic material, such as a wax with a melting point at or slightly above the body temperature. On administration, the compound will then gradually be extracted into the gastro-intestinal tract without disintegration of the tablet core whereby a controlled diuresis and a prolonged effect is obtained.

In this embodiment, if the composition of the invention in dosage unit form contains other active ingredients, these may be contained in the coating material for the core of the sustained-release tablet whereby a tablet is provided which is particularly advantageous in the control of hypertension.

Thus, the coating may contain ingredients such as reserpine and other alkaloids, methyldopa, and similar hypotensors.

On the other hand, the sustained-release tablet may advantageously contain a potassium salt in the tablet core in order to obtain a slow release of the potassium ion, thereby avoiding disturbances in the gastro-intestinal tract due to instantaneous high salt-concentrations after the intake.

Another object of the invention resides in the selection of a dose of the 3 - butylamino - 4 - phenoxy - 5 - sulfamyl-benzoic acid and its salts which can be administered so that the desired activity is achieved without simultaneous secondary effects. It has been found that 3-butylamino - 4 - phenoxy - 5 - sulfamyl - benzoic acid and its salts are conveniently administered in dosage units containing not less than 0.1 mg., and up to 10 mg., preferably from 0.25 to 2.5 mg., calculated as the free acid 3-butylamino-4-phenoxy-5-sulfamyl-benzoic acid.

By the term "dosage unit" is meant a unitary, i.e. a single dose which is capable of being administered to a patient, and which may be readily handled and packed, remaining as a physically stable unit dose comprising either the active material as such or a mixture of it with solid or liquid pharmaceutical diluents or carriers.

If the composition is to be injected, a sealed ampoule, a vial or a similar container may be provided containing a parenterally acceptable aqueous or oily injectable solution or dispersion of the active material as the dosage unit.

It is still another object of the invention to provide a method of treating patients suffering from oedematous conditions and hypertension, the method comprising administering to the patient from 0.1 to 25 mg. per day of 3 - butylamino - 4 - phenoxy - 5 - sulfamyl - benzoic acid or a corresponding dose of one of its salts with pharmaceutically acceptable bases. Preferably, the compound is given in the form of the dosage unit aforesaid.

For oral administration, the dosage unit may conveniently contain from 0.1–10 mg. of the 3-butylamino-4-phenoxy-5-sulfamyl-benzoic acid, as such or in the form of one of its salts, the unit being in the form of a tablet, a pill, or a capsule, to be given at suitable intervals, for instance once, twice, or thrice daily, always depending, however, on the patient and his condition. Preferably, each tablet contains from 0.25 to 2.5 mg. of the 3-butyl-amino - 4 - phenoxy - 5 - sulfamyl - benzoic acid, or a corresponding amount of one of its salts. If the dosage unit is injectable, the unit may consist of from 0.1 to 5 mg. of the 3 - butylamino - 4 - phenoxy - 5 - sulfamyl-benzoic acid, and conveniently from 0.2 to 2 mg. dissolved in an aqueous solvent, the said dosage unit for instance being enclosed in an ampul containing, for example, 2 ml. of a 0.025 percent aqueous solution of the sodium salt of 3 - butylamino - 4 - phenoxy - 5 - sulfamyl-benzoic acid.

The parenteral preparations are in particular useful in the treatment of conditions in which a quick dehydration is desirable, e.g. in the intensive therapy in the case of oedemas in the lung. In the continuous therapy of patients suffering from e.g. hypertension, the tablets or capsules may be the appropriate form of pharmaceutical preparation owing to the prolonged effect obtained when the drug is given orally, in particular in the form of sustained-release tablets.

In the treatment of heart failure and hypertension such tablets may advantageously contain other active components, as specified hereinbefore.

Thus for instance the tablets may contain each 0.25 mg. of the 3 - butylamino - 4 - phenoxy - 5 - sulfamyl-benzoic acid or one of its salts in combination with hydralazine in amounts from 10 to 50 mg., or reserpine in amounts from 0.05 to 0.5 mg., or from 20 to 100 mg. in the form of powdered whole root, or protoveratrine in amounts ranging from 0.05 to 0.4 mg., and if in the form of a mixture of alkaloids, e.g. *Veratrum viride*, 50 mg. is preferred, or methyldopa in amounts from 100 to 500 mg., and furthermore the tablets may contain, as a tranquilizer, meprobamate (2:2 - di(carbamoyloxymethyl)-pentane) in amounts from 100 to 400 mg., preferably 150 mg. to 250 mg.

A method of producing 3-butylamino-4-phenoxy-5-sulfamyl-benzoic acid and salts thereof will be described in details in the following.

3-NITRO-4-PHENOXY-5-SULFAMYL-BENZOIC ACID

A mixture of 4-chloro-3-nitro-5-sulfamyl-benzoic acid (140 g.), phenol (100 g.), sodium hydrogencarbonate (170 g.), and water (1000 ml.) was heated to 85° C. while stirring and kept at this temperature for 16 hours. After cooling to 4° C., the precipitated sodium salt of 3-nitro-4-phenoxy-5-sulfamyl-benzoic acid was filtered off and washed with ice-water. The sodium salt was dissolved in boiling water (3000 ml.), and the 3-nitro-4-phenoxy-5-sulfamyl-benzoic acid was precipitated by addition of 4 N hydrochloric acid. After cooling, the acid was isolated by suction and dried. The melting point was 255–256° C.

3-AMINO-4-PHENOXY-5-SULFAMYL-BENZOIC ACID

A suspension of 3-nitro-4-phenoxy-5-sulfamyl-benzoic acid (20 g.) in water (100 ml.) was adjusted to pH 8 by addition of 1 N lithium hydroxide. The resulting solution was hydrogenated at room temperature and 1.1 atmospheres hydrogen pressure after addition of Pd on carbon catalyst (0.6 g. catalyst containing 10% Pd). After the hydrogen uptake had become negligible, the catalyst was removed by filtration, and the 3-amino-4-phenoxy-5-sulfamyl-benzoic acid was precipitated from the filtrate by addition of 4 N hydrochloric acid to pH 2.5. After recrystallization from aqueous ethanol and drying, the melting point was 255–256° C.

3-n-BUTYLAMINO-4-PHENOXY-5-SULFAMYL-BENZOIC ACID

To a suspension of 3-amino-4-phenoxy-5-sulfamyl-benzoic acid (10 g.) in n-butanol (200 ml.), concentrated sulfuric acid (2 ml.) was added while stirring. The reaction mixture was heated under reflux under conditions in which the water formed during the reaction could be removed. When, after dilution with n-butanol, the NMR-spectrum of a sample of the reaction mixture showed at the two doublets of the aromatic protons in ring A that the butyl - 3 - amino - 4 - phenoxy - 5 - sulfamyl - benzoate formed as an intermediate was more than 90% converted to the corresponding 3-n-butylamino-benzoate, 2 N sodium hydroxide (200 ml.) was added and the boiling was continued for 45 minutes. After the saponification, the reaction mixture was neutralized to pH 8 by addition of concentrated hydrochloric acid. By cooling the sodium salt of 3-n-butyl-amino-4-phenoxy-5-sulfamyl-benzoic acid precipitated. It was filtered off and recrystallized from water (100 ml.). The sodium salt, crystallizing with 3 molecules of water, was then dissolved in boiling water (200 ml.), 1 N hydrochloric acid was added to pH 2.5, and after cooling the precipitated 3-n-butylamino-4-phenoxy-5-sulfamyl-benzoic acid was collected by filtration. After recrystallization from aqueous ethanol and drying, the pure compounds was obtained with melting point 230–231° C.

ETHANOLAMINE SALT OF 3-n-BUTYLAMINO-4-PHENOXY-5-SULFAMYL-BENZOIC ACID 3-n-butylamino-4-phenoxy - 5 - sulfamyl - benzoic acid (1.82 g.) was dissolved in boiling ethanol (20 ml.) and a solution of ethanolamine (0.3 g.) in ethanol (15 ml.) was added. After cooling, the precipitated ethanolamine salt was collected by filtration and recrystallized from ethanol. The melting point was 194–195° C.

POTASSIUM SALT OF 3-n-BUTYLAMINO-4-PHENOXY-5-SULFAMYL-BENZOIC ACID

Ethanolamine salt of 3-n-butylamino-4-phenoxy-5-sulfamyl-benzoic acid (10 g.) was dissolved in boiling water (50 ml.) and aqueous saturated potassium chloride solution (5 ml.) was added. After cooling, the precipitated potassium salt was collected by filtration and recrystallized from water.

The following non-limiting examples are illustrative of the compositions of the invention:

EXAMPLE I

Tablets containing free 3-butylamino-4-phenoxy-5-sulfamyl-benzoic acid

Ingredients: G.
3 - butylamino - 4 - phenoxy-5-sulfamyl-benzoic acid _____ 3
Corn starch _____ 250
Lactose _____ 250
Talc _____ 25

The ingredients were mixed and screened through a 20 mesh per linear inch sieve and subsequently treated with an aqueous solution of gelatin (4 percent) in sufficient amount to form a granulate. The granulate was dried and broken on a 16 mesh per linear inch sieve. After addition of talc, the granulate was compressed into tablets of 180 mg. each, using 8 mm. punches and dies, to obtain 3000 tablets, each containing 1 mg. of the free 3-butylamino-4-phenoxy-5-sulfamyl-benzoic acid.

The effect of the tablets was tested as follows:

Nine healthy persons received each 1 tablet corresponding to 1 mg. of the drug, whereafter the urinary excretion was observed for 24 hours. The average effect appears from the following Table II, in which is also tabulated the corresponding effects after administering to the same persons of fursemide in the dose of 1 tablet containing 40 mg. fursemide per person.

TABLE II.—AVERAGE URINARY VOLUME AND EXCRETION OF SODIUM AND CHLORIDE IN MAN AFTER ORAL ADMINISTRATION OF 1.0 MG. OF 3-BUTYLAMINO-4-PHENOXY-5-SULFAMYL-BENZOIC ACID AND OF 40 MG. OF FURSEMIDE, RESPECTIVELY

| | Hours after administration | | | | | | | | | | | |
|---|---|---|---|---|---|---|---|---|---|---|---|---|
| | Sodium (meq.) | | | Chloride (meq.) | | | Volume (ml.) | | | Potassium (meq.) | | |
| Treatment | 0-6 | 6-24 | 0-24 | 0-6 | 6-24 | 0-24 | 0-6 | 6-24 | 0-24 | 0-6 | 6-24 | 0-24 |
| Tablets of the invention, active substance | 201 | 48 | 249 | 236 | 40 | 276 | 1,784 | 577 | 2,361 | 47 | 34 | 81 |
| Fursemide tablets ~40 mg. active substance | 215 | 45 | 260 | 243 | 33 | 276 | 1,842 | 587 | 2,429 | 51 | 29 | 80 |
| Controls | 57 | 94 | 151 | 66 | 80 | 146 | 387 | 607 | 994 | 32 | 33 | 65 |

EXAMPLE II

Capsules containing the free 3-butylamino-4-phenoxy-5-sulfamyl-benzoic acid

Ingredients: G.
Micronized 3 - butylamino - 4 - phenoxy-5-sulfamylbenzoic acid _____ 1.5
Lactose _____ 184
Magnesium stearate _____ 2

The ingredients were mixed and passed through a 60 mesh per linear inch sieve and subsequently further mixed for 15 minutes. The mixture was filled into No. 3 gelatin capsules (Parke, Davis and Co.), using a semi-automatic capsule-filling machine shaken by vibrator. Each capsule contains 125 mg. of the mixture, and in all 1500 capsules, each containing 1 mg. of the free 3-butylamino-4-phenoxy-5-sulfamyl-benzoic acid were obtained.

EXAMPLE III

Tablets containing the potassium salt of 3-butylamino-4-phenoxy-5-sulfamyl-benzoic acid Ingredients: G.
3 - butylamino - 4 - phenoxy-5-sulfanyl-benzoic acid as the potassium salt _____ 6
Lactose _____ 650
Corn starch _____ 844

The potassium salt was mixed with the other ingredients and granulated after moistening with a 10 percent aqueous solution of polyvinyl pyrrolidone.

The granulate was dried and broken on a 16 mesh per linear inch sieve. After addition of 100 g. of talc and 10 g. of magnesium stearate, and mixing, the mixture was compressed into tablets, using 10 mm. punches and dies, yielding 250 mg. tablets, each containing active substance corresponding to 1 mg. of 3 - butylamino-4-phenoxy-5-sulfamyl-benzoic acid.

EXAMPLE IV

Capsules containing 3-butylamino-4-phenoxy-5-sulfamyl-benzoic acid and methyldopa Ingredients: G.
3 - butylamino - 4 - phenoxy-5-sulfamyl-benzoic acid _____ 0.4
Lactose _____ 176
Talc _____ 15
D,L-methyldopa _____ 200

The ingredients were mixed and passed through a 60 mesh per linear inch sieve. The resultant mixture was subdivided and filled into capsules, each containing 0.2 mg. of the free 3-butylamino - 4 - phenoxy-5-sulfamyl-benzoic acid and 100 mg. of D,L-methyldopa.

EXAMPLE V

Ampuls containing the sodium salt of 3-butylamino-4-phenoxy-5-sulfamyl-benzoic acid Ingredients: G.
3-butylamino - 4 - phenoxy-5-sulfamyl-benzoic acid _____ 1
Sodium hydroxide _____ 0.13
Sodium chloride _____ 36
Sterile water up to 4000 ml.

The acid was suspended into water, the suspension was adjusted to pH 7.5 with aqueous sodium hydroxide and then diluted up to 4000 ml. The resulting solution was sterilized by filtration. The sterile solution was thereafter filled into ampuls under aseptic conditions, yielding 2000 ampuls of 2 ml. each.

EXAMPLE VI

Tablets containing 3-butylamino-4-phenoxy-5-sulfamyl-benzoic acid and reserpine

Ingredients: G.
3 - butylamino - 4-phenoxy-5-sulfamyl-benzoic acid _____ 5
Reserpine _____ 1
Lactose _____ 1249
Corn starch _____ 1925

The reserpine was triturated with 100 g. of lactose, and the mixture was forced through a 30 mesh per linear inch sieve. Thereafter the other ingredients were incorporated, and the mixture was granulated with sufficient ethyl alcohol/water (60 percent). The granulate was dried and broken on a 16 mesh per linear inch sieve. After addition of 200 g. of talc and 20 g. of magnesium stearate, and mixing, the mixture was compressed into tablets, using 10 mm. punches and dies, yielding tablets of 340 mg. containing 0.5 mg. of 3-butylamino-4-phenoxy-5-sulfamyl-benzoic acid and 0.1 mg. of reserpine.

In a similar manner, tablets were prepared which contained 0.5 mg. of 3 - butylamino-4-phenoxy-5-sulfamyl-benzoic acid, and 10 mg. of hydralazine.

EXAMPLE VII

Tablets containing 3-butylamino-4-phenoxy-5-sulfamyl-benzoic acid and potassium chloride Ingredients: G.
Micronized 3-butylamino - 4 - phenoxy-5-sulfamylbenzoic acid _____ 10
Potassium chloride (passed through a 30 mesh per linear inch sieve) _____ 2500
Talc _____ 75
Polyvinyl pyrrolidone _____ 50

The ingredients were thoroughly mixed and without granulation converted into tablets using 11 mm. punches and dies, yielding 5000 tablets of 526 mg., each containing 2 mg. of 3-butylamino-4-phenoxy-5-sulfamyl-benzoic acid and 500 mg. of potassium chloride.

EXAMPLE VIII

Sustained-release tablets containing each 2.5 mg. of 3-butylamino-4-phenoxy-5-sulfamyl-benzoic acid in the form of its sodium salt 2700 g. of lactose and 37.5 g. of the sodium salt of 3-butylamino-4-phenoxy-5-sulfamyl-benzoic acid were granulated with a 10 percent gelatin solution, dried and screened through a 60 mesh per linear inch sieve. The granulate was mixed with 290 g. of stearyl alcohol and 120 g. of talc, and the mixture was converted into tablets using 8 mm. punches and dies resulting in 15,000 tablets each of 210 mg. The tablets were coated in a tablet coating machine operating on the air suspension principle with a solution of 70 g. of methylcellulose in 1100 ml. of chloroform and 900 ml. of methanol. On completion of this coating process, the tablets were maintained suspended and circulating in the air stream while the temperature was raised to 75° C. and then lowered. The increased temperature may be provided by increasing the temperature of the air, by radiation, by high frequency heating, or otherwise, whereby the stearyl alcohol of the tablet core is liquified and after cooling, tablets are provided in which the active material is embedded into a matrix of stearyl alcohol from which it is liberated slowly in the gastro-intestinal tract by diffusion without disintegration of the tablet.

EXAMPLE IX

Sustained-release tablets containing 1.0 mg. of 3-butylamino-4-phenoxy-5-sulfamyl-benzoic acid as its sodium salt, and 0.1 mg. of reserpine Sustained-release tablets were prepared as described in Example VIII, each containing 1.0 mg. of the sodium salt of 3-butylamino-4-phenoxy-5-sulfamyl-benzoic acid embedded in a matrix of stearyl alcohol. In a manner known per se the tablets were coated with saccharose containing reserpine. The coating was performed in a pan by successively adding an aqueous solution containing 65% saccharose, 0.6% gelatin, and 0.5% reserpine until the coating layer of each tablet contained 0.1 mg. reserpine.

I claim:

1. A pharmaceutical preparation in dosage unit form for the treatment of patients suffering from oedematous conditions and hypertension, comprising as at least one active component a member of the group consisting of 3-butylamino-4-phenoxy-5-sulfamyl-benzoic acid and its salts with pharmaceutically acceptable inorganic and organic bases selected from the group consisting of alkali and alkaline earth metal bases, ammonia, ethanolamine and diethanolamine together with an atoxic pharmaceutically acceptable carrier, the quantity of the said active component in the unit being between 0.1 and 10 mg., calculated as the free 3-butylamino-4-phenoxy-5-sulfamyl-benzoic acid.

2. A pharmaceutical preparation in oral dosage unit form according to claim 1, in which the units contain from 0.1 to 10 mg. of the 3-butylamino-4-phenoxy-5-sulfamyl-benzoic acid as an alkali metal salt.

3. A pharmaceutical preparation in oral dosage unit form according to claim 1, in which the units contain from 0.1 to 10 mg. of the free 3-butylamino-4-phenoxy-5-sulfamyl-benzoic acid.

4. A pharmaceutical preparation in dosage unit form which contains, as a diuretic, a member of the group consisting of the 3-butylamino-4-phenoxy-5-sulfamyl-benzoic acid and its salts with pharmaceutically acceptable inorganic and organic bases selected from the group consisting of alkali and alkaline earth metal bases, ammonia, ethanolamine and diethanolamine, and as a hypotensor a member of the group consisting of *Rauwolfia serpentina* alkaloids and Veratrum alkaloids, together with an atoxic pharmaceutically acceptable carrier, the quantity of the diuretic being being 0.1 and 10 mg., calculated as the free 3-butylamino-4-phenoxy-5-sulfamyl-benzoic acid, and the quantity of hypotensor being between 0.05 and 0.5 mg.

5. A pharmaceutical preparation in dosage unit form which contains, as a diuretic, a member of the group consisting of 3-butylamino-4-phenoxy-5-sulfamyl-benzoic acid and its salts with pharmaceutically acceptable inorganic and organic bases selected from the group consisting of alkali and alkaline earth metal bases, ammonia, ethanolamine and diethanolamine, and as a hypotensor, hydralazine, together with an atoxic pharmaceutically acceptable carrier, the quantity of the diuretic being between 0.1 and 10 mg., calculated as the free-3-butylamino-4-phenoxy-5-sulfamyl-benzoic acid, and the quantity of hydralazine being between 5 and 50 mg.

6. A pharmaceutical preparation in dosage unit form which contains, as a diuretic, a member of the group consisting of 3-butylamino-4-phenoxy-5-sulfamyl-benzoic acid and its salts with pharmaceutically acceptable inorganic and organic bases selected from the group consisting of alkali and alkaline earth metal bases, ammonia, ethanolamine and diethanolamine, and as a hypotensor, methyldopa, together with an atoxic pharmaceutically acceptable carrier, the quantity of the diuretic being between 0.1 and 10 mg., calculated as the free 3-butylamino-4-phenoxy-5-sulfamyl-benzoic acid, and the quantity of methyldopa being between 100 and 500 mg.

7. A pharmaceutical preparation in dosage unit form as claimed in claim 4, which also contains 2:2-di(carbamoyloxymethyl)-pentane in an amount between 100 and 400 mg.

8. A pharmaceutical preparation in dosage unit form as claimed in claim 5, which also contains 2:2-di(carbamoyloxymethyl)-pentane in an amount between 100 and 400 mg.

9. A pharmaceutical preparation in dosage unit form as claimed in claim 6, which additionally contains 2:2-di(carbamoylmethyl)-pentane in an amount between 100 and 400 mg.

10. An injectable pharmaceutical preparation in dosage unit form, in which the units contain from 0.2 to 2 mg. of 3-butylamino-4-phenoxy-5-sulfamyl-benzoic acid in the form of a salt with a pharmaceutically acceptable base selected from the group consisting of alkali and alkaline earth metal bases, ammonia, ethanolamine and diethanolamine, dissolved in an aqueous medium.

11. The method of treating patients suffering from oedematous conditions and hypertension, which comprises administering to the patient from 0.1 to 25 mg. per day of a member of the group consisting of 3-butylamino-4-phenoxy-5-sulfamyl-benzoic acid and its salts with pharmaceutically acceptable inorganic and organic bases selected from the group consisting of alkali and alkaline earth metal bases, ammonia, ethanolamine and diethanolamine.

12. A method as claimed in claim 11, which comprises the oral administration of an alkali metal salt of 3-butylamino-4-phenoxy-5-sulfamyl-benzoic acid in the form of tablets.

13. A method as claimed in claim 11, which comprises the oral administration of the free 3-butylamino-4-phenoxy-5-sulfamyl-benzoic acid in the form of tablets.

14. A method as claimed in claim 11, which comprises the oral administration of the free 3-butylamino-4-phenoxy-5-sulfamyl-benzoic acid in the form of capsules.

15. A method as claimed in claim 11, which comprises the oral administration of the 3-butylamino-4-phenoxy-5-sulfamyl-benzoic acid or its salts in the form of a sustained-release preparation in dosage unit form, in which the dose of 3-butylamino-4-phenoxy-5-sulfamyl-benzoic acid ranges from 0.1 to 10 mg.

16. A method as claimed in claim 15, in which the sustained-release preparation in dosage unit form additionally contains a substance selected from the group consisting of *Rauwolfia serpentina* alkaloids, the veratum alkaloids, hydralazine, methyldopa, meprobamate, and triamterene.

17. A method as claimed in claim 16, in which the 3-butylamino-4-phenoxy-5-sulfamyl-benzoic acid or its salt is embedded in to a hydrophobic matrix which is coated with a water-soluble coating material containing a substance selected from the group consisting of *Rauwolfia serpentina* alkaloids, the veratrum alkaloids, hydralazine, methyldopa, meprobamate, and triamterene.

18. A method as claimed in claim 11, which comprises injection of an aqueous solution of the salt of 3-butylamino-4-phenoxy-5-sulfamyl-benzoic acid in doses from 0.1 to 25 mg. per day.

References Cited
UNITED STATES PATENTS 3,050,553  8/1962  Novello _____ 424—319

SAM ROSEN, Primary Examiner

U.S. Cl. X.R.

424—319; 260—519

UNITED STATES PATENT OFFICE
CERTIFICATE OF CORRECTION

Patent No. 3,634,583          Dated January 11, 1972

Inventor(s) PETER WERNER FEIT

It is certified that error appears in the above-identified patent and that said Letters Patent are hereby corrected as shown below:

In column 9, line 72, "Veratrum" should read -- veratrum --.

In column 10, lines 36-37, "2:2-dicarbamoylmethyl) pentane" should read -- 2:2-di(carbamoyloxymethyl) pentane --.

In column 10, line 74, "veratum" should read -- veratrum --.

In column 11, line 4, "in to" should read -- into --.

Signed and sealed this 13th day of June 1972.

(SEAL)
Attest:

EDWARD M. FLETCHER, JR.             ROBERT GOTTSCHALK
Attesting Officer                     Commissioner of Patents